E. TAYLOR.
CONTROL VALVE FOR ROTARY ENGINES.
APPLICATION FILED MAR. 20, 1906.

899,814.

Patented Sept. 29, 1908.
4 SHEETS—SHEET 1.

Inventor
Edwin Taylor

Witnesses

Attorneys

E. TAYLOR.
CONTROL VALVE FOR ROTARY ENGINES.
APPLICATION FILED MAR. 20, 1906.

899,814.

Patented Sept. 29, 1908.
4 SHEETS—SHEET 2.

Witnesses
J. G. Stinkel
J. J. McCarthy

Inventor
Edwin Taylor
by Foster, Freeman & Watson
Attorneys

E. TAYLOR.
CONTROL VALVE FOR ROTARY ENGINES.
APPLICATION FILED MAR. 20, 1906.
899,814.
Patented Sept. 29, 1908.
4 SHEETS—SHEET 3.
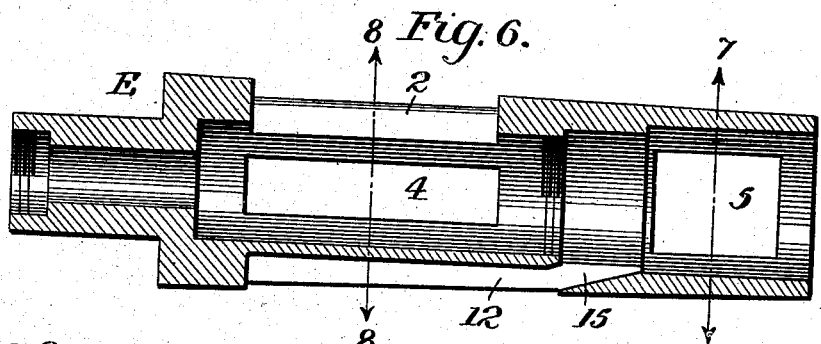
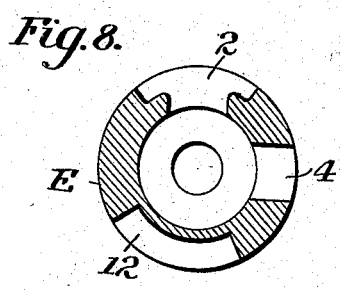
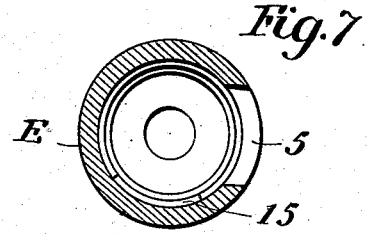
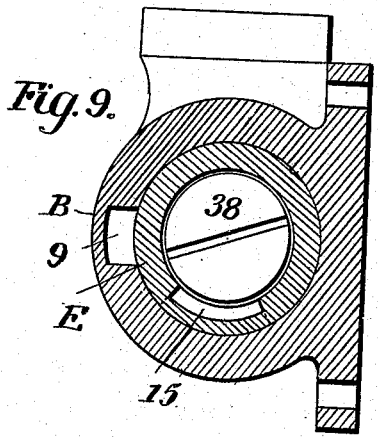
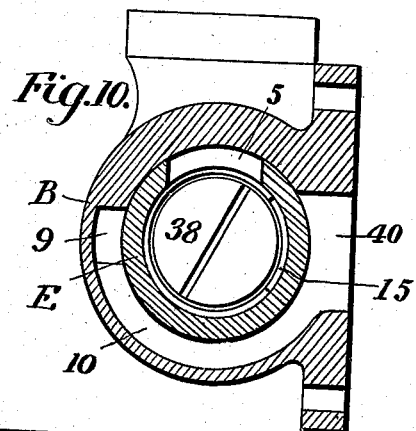
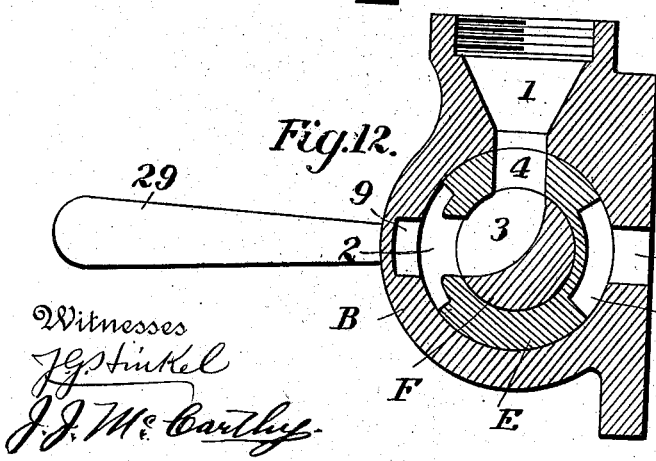
Witnesses
Inventor
Edwin Taylor
Attorneys E. TAYLOR.
CONTROL VALVE FOR ROTARY ENGINES.
APPLICATION FILED MAR. 20, 1906.
899,814.
Patented Sept. 29, 1908.
4 SHEETS—SHEET 4.
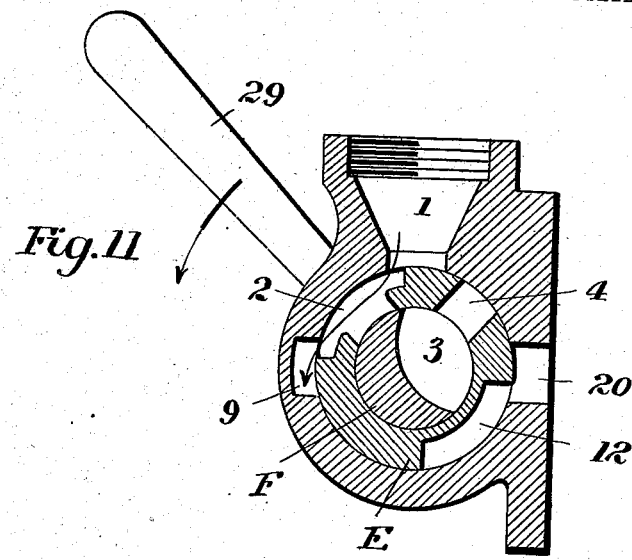
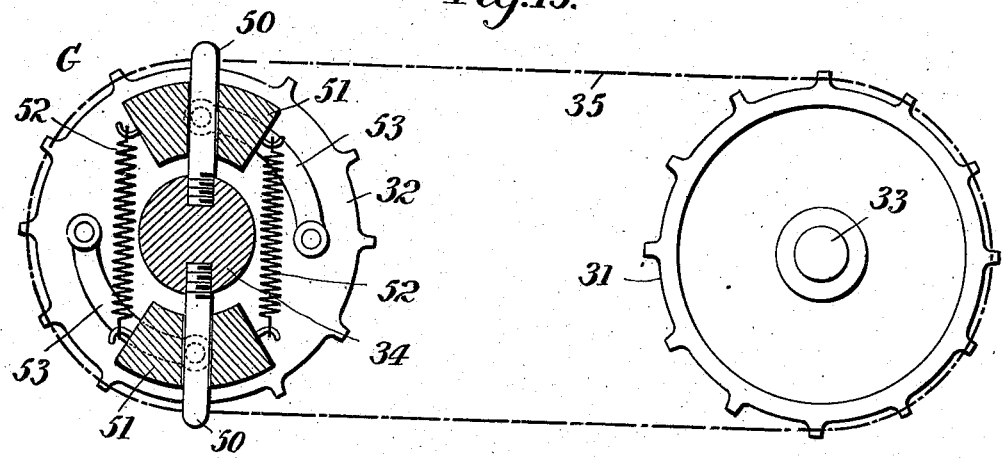

UNITED STATES PATENT OFFICE.

EDWIN TAYLOR, OF NEW YORK, N. Y., ASSIGNOR TO TAYLOR HERRICK ROTARY ENGINE COMPANY, A CORPORATION OF NEW YORK.

CONTROL-VALVE FOR ROTARY ENGINES.

No. 899,814.  Specification of Letters Patent.  Patented Sept. 29, 1908.

Application filed March 20, 1906. Serial No. 307,104.

*To all whom it may concern:*

Be it known that I, EDWIN TAYLOR, a citizen of the United States, residing in the borough of Brooklyn, in the city of New York, State of New York, have invented certain new and useful Improvements in Control-Valves for Rotary Engines, of which the following is a specification.

My invention relates to valve devices, especially intended for rotary engines, and consists in a valve device having a tubular valve and rotatable cut-off plug, and constructed and arranged so that the position of the plug cannot at any time prevent the motor fluid from being transmitted to the engine to start the same, and in certain details of construction as fully set forth hereinafter and illustrated in the accompanying drawings, in which,—

Figure 1:
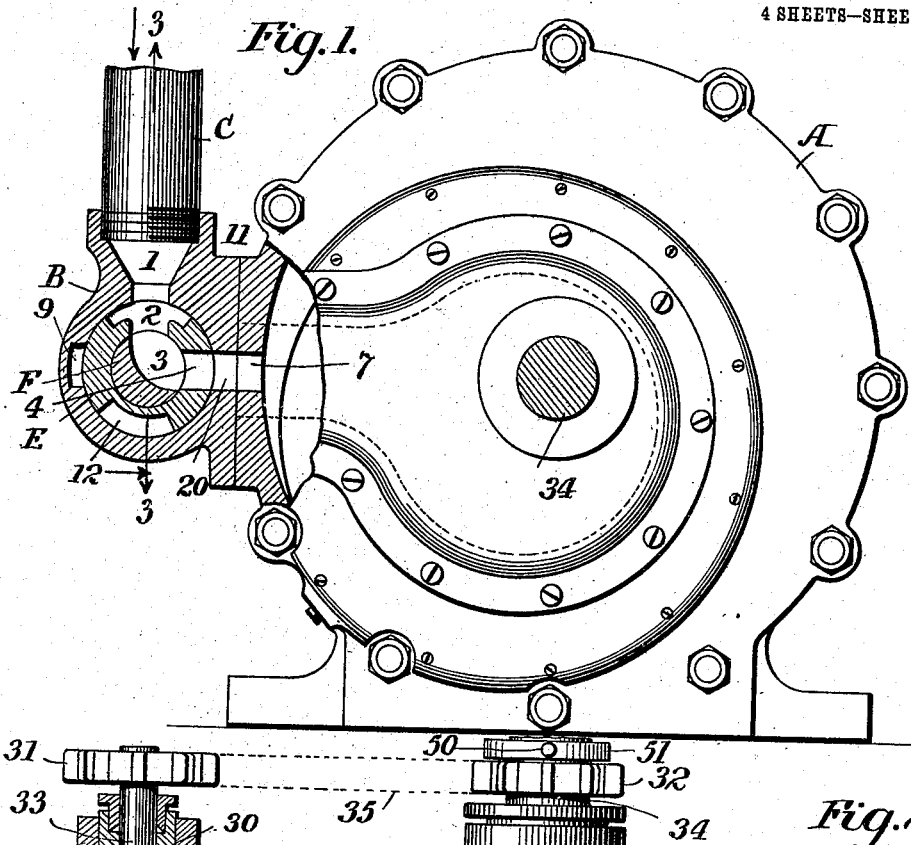
Figure 2:
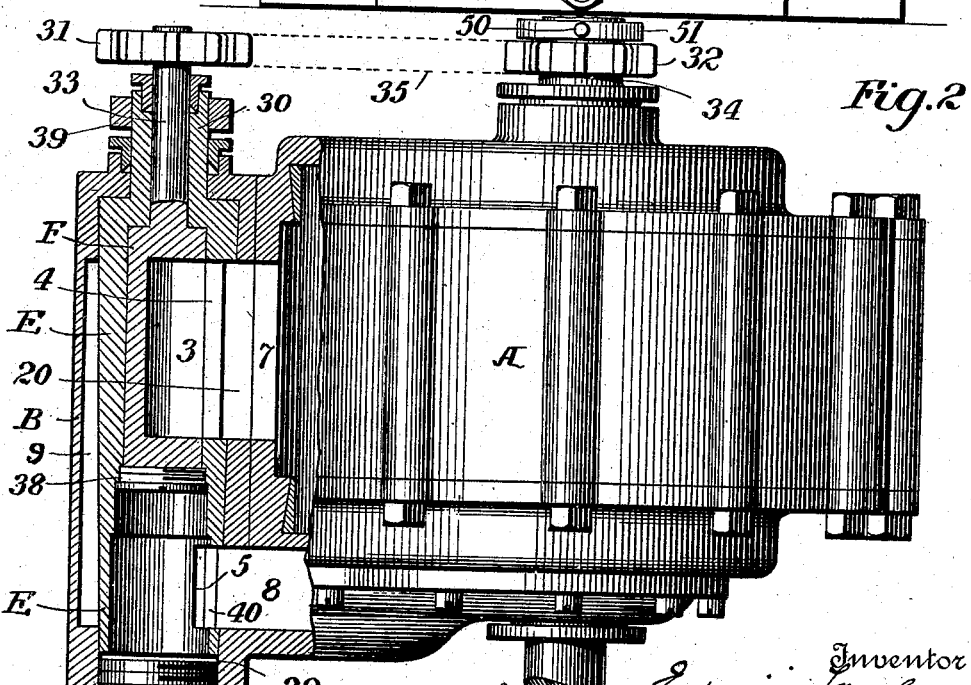
Figure 3:
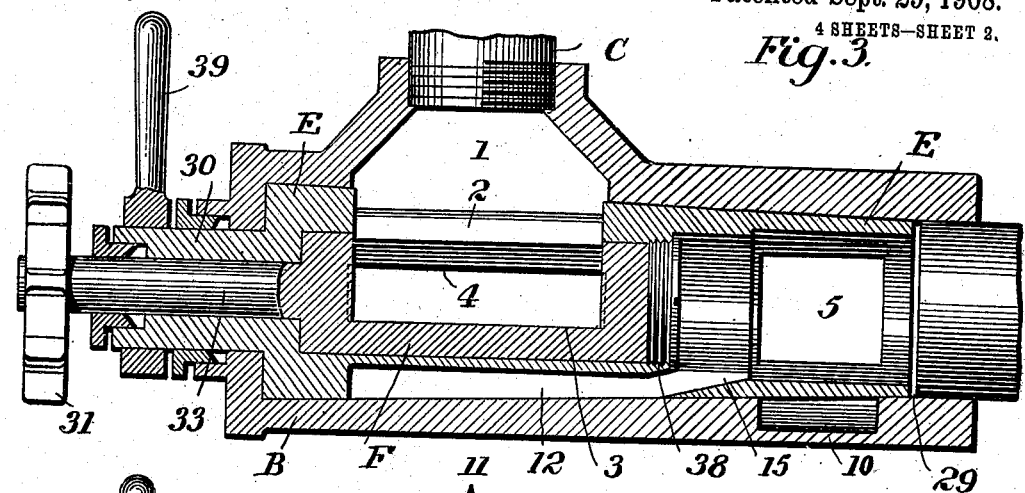
Figure 4:
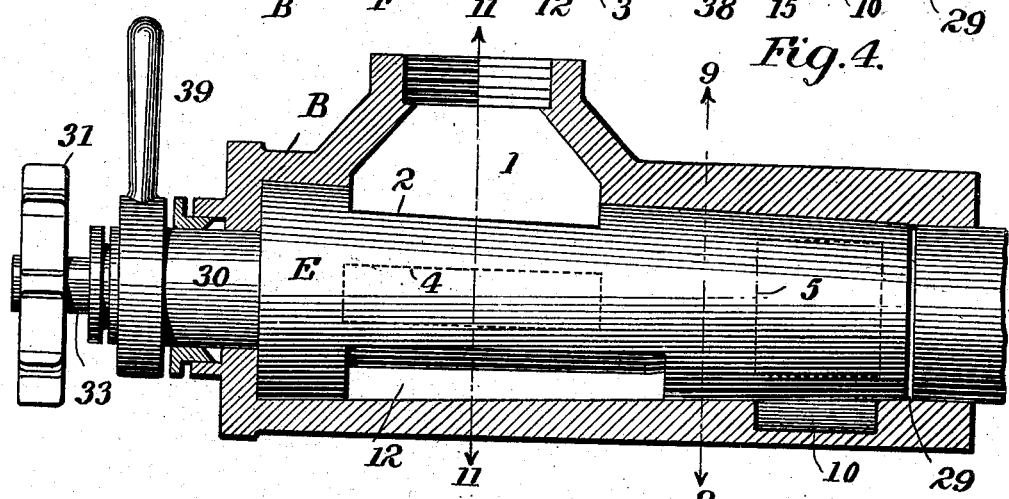
Figure 5:
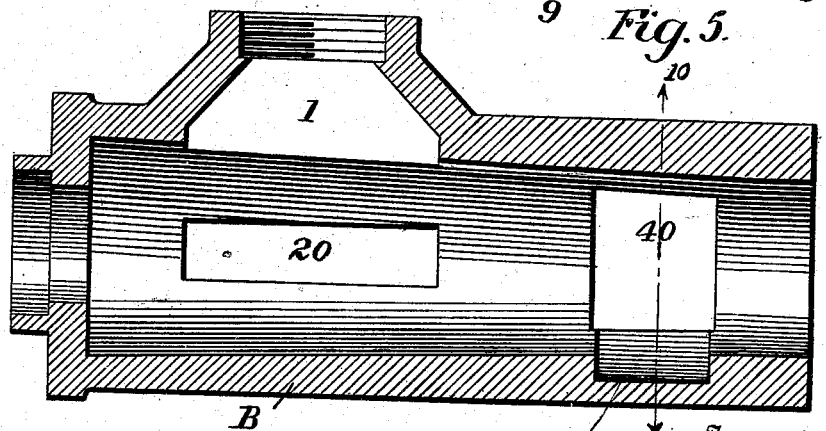

Figure 1 is a sectional elevation of an engine provided with my improved valve device; Fig. 2 is a sectional plan; Fig. 3, a transverse section on the line 3—3, Fig. 1, looking in the direction of the arrow; Fig. 4, a similar view showing the exterior of the tubular valve; Fig. 5 is a similar section through the case showing the valve removed; Fig. 6, a section through the valve removed from the case; Fig. 7, a section on the line 7—7, Fig. 6; Fig. 8, a section on the line 8—8, Fig. 6; Fig. 9, a section on the line 9—9, Fig. 4 with the valve in position for running forward; Fig. 10, a section on the line 10—10, Fig. 5 with the valve in position for reversing; Figs. 11 and 12, sections on the line 11—11, Fig. 4, but with the valve in different positions; Fig. 13 is a view illustrating the governor.

For the purpose of illustrating my valve, I have shown it in connection with an engine of the rotary type, in the casing A of which are the inlet port 7 and the exhaust port 8, which ports communicate with ports 20, 40, in the casing B of the tubular tapering valve E. With the latter casing communicates a supply steam pipe C, the exhaust passing from the casing B through a port 29 at one end, which port is practically a part of a chamber in which is situated the tubular valve E having a tubular stem 30 extending through a suitable packing box at the opposite end of the casing and provided with a handle 39. Within the valve E is a plug F cut away to form a channel or passage 3 and having a stem 33 extending through the hollow stem of the valve and carrying a sprocket 31 connected with a sprocket 32 on a shaft 34 of the engine by means of a chain 35, so that the plug F which constitutes the cut-off will rotate once to each rotation of the engine shaft. The plug is secured within the valve by means of a screw block 38. This cut off plug F extends within the valve E beyond the limits of the port 4, which may communicate with the inlet 7 of the casing A through the port 20 of the casing B, so that the valve E extends as a hollow sleeve or tube beyond the end of the plug and is there provided with a port 5 cut through the same and adapted to be brought in communication with the port 40 and the exhaust port 8 of the engine.

In the valve E the port 4 corresponds in area substantially with the port 20, and another port 2 in the valve at about right angles to the port 4 and of about the same area at the inside of the valve is extended in both directions at the outer face of the valve so as to cover approximately one-fourth the periphery thereof.

The casing B has a supply port 1 communicating with the pipe C and when the engine is not running reversed, the valve E is in the position shown in Fig. 1, when the steam will flow through the ports 1 and 2, channel 3 and ports 4 and 20, to the port 7 of the engine, and will pass to the exhaust port 8, and through the port 40 of the casing B and port 5 of the valve into the interior of the tubular end of the latter and out to the exhaust port 29.

It will be evident that as the cut off plug F rotates once to each rotation of the engine, it may be so set that in running the engine forward, the plug may be caused to close the port 4 at any desired period of the stroke, the closure generally continuing about one-half of the rotation, which would cut off about one-fourth of the stroke. Of course this could be varied by a change in the proportions of the parts. While this cut-off action is thus secured, there is no possibility of the parts of the valve being brought to such position that the engine cannot be started in any position of the cut off. This results from the fact that the inner mouth of the port 2, which is controlled by the cut off plug, is less in width peripherally than the outer mouth of the said port, which is of such extent that the valve E may be turned to put the port 1 in communication with the port 7 so that steam is admitted directly to the engine whether or not the cut off plug F is in position to close the port 2 at its inner mouth. This insures the ability to start the engine at any time regardless of the cut off, but after the engine is once started, and the cut off begins its rotation by the action of the engine, the valve E is brought to the position shown in Fig. 1, when communication between the port 1 and the port 7 will only be effected through the channel in the cut off, and the latter will operate to effectively perform its functions.

While it may not always be necessary to secure a reverse action, it is in many instances desirable, and sometimes absolutely essential. I therefore provide means to procure this effect. To this end the casing B has two ports each of which may be a discharge port, and there is a longitudinal port or channel 9 in the casing at the side opposite the port 20 (see Figs. 2 and 9) and at the inside end of the casing the channel 9 connects with a curved port 10 within the casing, extending transversely and communicating at its inner end with the port 40 (Figs. 2 and 10).

In the face of the valve E is a longitudinal channel 12 (Figs. 3, 5, 6 and 8) at the side opposite the port 2, and at the exhaust end of the valve the channel 12 communicates through an inclined portion 15 (Fig 3) with the interior of the valve beyond the end of the plug 38.

To reverse the engine the valve E is turned by swinging the handle 39 towards the left (Figs. 11 and 12) and as the widened outer part of the port 2 is carried to the position shown in Fig. 11, the inflowing steam is cut off from the port 3, but is directed through a by-pass, consisting of the said port 2 which carries the steam, outside of the cut-off plug, to the channel 9, and through the channel 10 (Figs. 2 and 10), to the port 40 and to the discharge port E of the engine, reversing the latter. The movement of the valve is continued until it is in the position shown in Fig. 12, and the steam then flows from the engine through the port 7 to the discharge port 20 of the casing, and to the channel 12 of the valve and along the latter to the inside of the valve at the exhaust end and is discharged through the exhaust 29. On the reversal of the engine the plug F reverses its direction of rotation so that the steam will pass to the port 2 through the channel 3. The valve E with its port 2 is thus under the control of the operator to connect the supply port 1 with either port or passage 40 or 20, so that the engine may be supplied to be run by direct pressure in either direction for starting or when heavily loaded, and independently of the position of the cut-off, but the latter may be adjusted to cut-off at any desired part of the stroke, running in either direction.

To properly regulate the engine any suitable means may be used for governing or controlling the relation of the cut-off and the valve, according to the speed. As shown, I make use of a governor G (Fig. 13) and connections whereby the sprocket 32 is advanced or retarded in its position on the shaft 34 while being compelled to rotate therewith. Thus the shaft carries radial rods 50 on which slide the weights 51 of the governor, and to each weight is pivoted a link 53, the other end of which is pivoted to the side of the sprocket.

Springs 52 tend to draw the weights toward the shaft, and the sprocket is then held so that the cut-off will act to cut off to the minimum extent. As the speed increases the weights move outward, and the sprocket is turned to so shift the cut-off plug F that the steam will be cut off earlier in the stroke in proportion as the weights move outward.

It will be evident that any other suitable form of governor may be employed.

It will be seen that the valve is extremely simple in construction and that the parts can be readily machined, the valve exteriorly being simply a tapering cylinder readily fitted to a tapering seat in the casing B, while the ports can either be formed by casting or readily made by milling, there being no tortuous passages or channels and the parts being readily assembled.

Without limiting myself to the precise construction and arrangement shown, I claim as my invention—

1. The combination in a valve device, of a casing having a seat for a tubular valve, an inlet port and ports arranged to communicate with the inlet and exhaust ports of an engine, and a valve rotatable within said casing and provided with a cut-off plug, the valve having a port with a contracted inner mouth controlled by the cut-off plug, and a wider outer mouth adapted to coincide simultaneously with the inlet port of the casing and with the port through which the steam passes to the engine.

2. The combination in a valve device, of a casing having supply and discharge ports, a tubular valve having a port 2 adapted to connect the supply and discharge ports of the casing and extending through the valve, and a cut-off plug adapted to cut off the flow between said port 2 and the engine.

3. The combination with a valve casing having its separated supply and discharge ports, of a tubular valve having a port 2 widened at the periphery of the valve so as to connect the supply and discharge ports, and contracted towards the inner face of the valve, and a cut-off plug constructed to close communication between the said port 2 and the interior of the valve.

4. The combination with a valve casing having its separated supply and discharge ports, of a tubular valve having a port 2 widened at the periphery of the valve so as to connect the supply and discharge ports and contracted towards the inner face of the valve, a cut-off plug constructed to close communication between the said port 2 and the interior of the valve, and means whereby to impart rotation to the cut-off plug.

5. The combination with the engine having supply and discharge ports, of a valve casing having a supply port, and a discharge port communicating with the supply port of the engine, and provided with a tubular valve having ports and channels, and an interior channeled cut-off plug extending through the tubular valve, means for rotating the said plug in unison with the movements of the piston of the engine, and means for setting the tubular valve to different positions.

6. In a valve device, the combination of a casing provided with a seat for a rotatable valve, a supply port and two discharge ports arranged to communicate with inlet and exhaust ports of an engine, and a valve fitted to said seat and provided with an internal cut-off, and with a port adapted to form a communication between the supply port and either discharge port, either through or around the cut-off.

7. In a valve device, the combination of a casing provided with a seat for a rotatable valve, a supply port and two discharge ports arranged to communicate with inlet and exhaust ports of an engine, and a valve fitted to said seat and provided with an internal rotatable cut-off, and with a port adapted to form a communication between the supply port and either discharge port either through or around the cut-off.

8. In a valve device, the combination of a casing provided with a seat for a rotatable valve, a supply port and two discharge ports arranged to communicate with inlet and exhaust ports of an engine, and a valve fitted to said seat and provided with an internal rotatable cut-off having a channel, and with a port adapted to form a communication between the supply port and either discharge port, either through or around the cut-off.

9. In a valve device, the combination of a casing provided with a seat for a rotatable valve, a supply port and two discharge ports arranged to communicate with inlet and exhaust ports of an engine, a valve fitted to said seat and provided with an internal cut-off and with a port adapted to form a communication between the supply port and either discharge port either through or around the cut-off, and means for rotating the cut-off from the engine.

10. The combination with the valve casing, its ports 1, 20, 40 and channels 9, 10, of a rotatable valve having a port 2 adapted to connect the port 1 with either port 20 or channel 9, a second port 4, and a cut-off rotatable within the valve and provided with the passage 3, whereby to put the ports 4 and 2 in communication.

11. The combination with the valve casing, its ports 1, 20, 40 and channels 9, 10, of a rotatable valve having a port 2 adapted to connect the port 1 with either port 20 or channel 9, a second port 4, a cut-off rotatable within the valve and provided with the passage 3, whereby to put the ports 4 and 2 in communication, and means for rotating the cut-off from the engine.

12. The combination with a valve casing having a supply port and two discharge ports, of a rotatable valve, and a rotatable channeled cut-off within the valve, the valve having a port adapted to connect the supply port with either of the discharge ports, either through or as a by-pass outside of the cut-off.

13. The combination with a valve casing, its supply port, different discharge ports and valve, of a rotatable cut-off within the valve, and ports and passages in the valve whereby to direct the motor fluid from the supply port to either discharge port, either through or around the cut-off.

14. The combination with a valve casing, its supply port, different discharge ports and valve, of a rotatable cut-off within the valve, ports and passages in the valve whereby to direct the motor fluid from the supply port to either discharge port either through or around the cut-off, and means for shifting the valve and for rotating the cut-off.

15. The combination in a valve device, of a casing, rotatable valve, and rotatable cut-off within the valve, the casing having a supply port and two discharge ports and the valve and casing having ports and passages whereby the supply port may be put in communication with either discharge port independently of the position of the cut-off.

16. The combination in a valve device, of a casing having a supply port and two discharge ports, a rotatable valve, and a rotatable channeled cut-off within the valve, said valve having a port arranged to be closed at its inner mouth by the cut-off and to connect by its outer mouth the supply port with either discharge port.

17. The combination with a valve device having an adjustable tubular valve and internal rotating cut-off plug, of means for rotating the cut-off plug from an engine, and a speed governor and means for rotatively advancing or retracting the position of the cut-off plug.

In testimony whereof I affix my signature in presence of two witnesses.

EDWIN TAYLOR.

Witnesses:
 CHARLES E. FOSTER,
 J. J. MCCARTHY.